D. G. EDWARDS.
CABLE HANGER.
APPLICATION FILED JAN. 24, 1914.
1,215,009.
Patented Feb. 6, 1917.
2 SHEETS—SHEET 1.
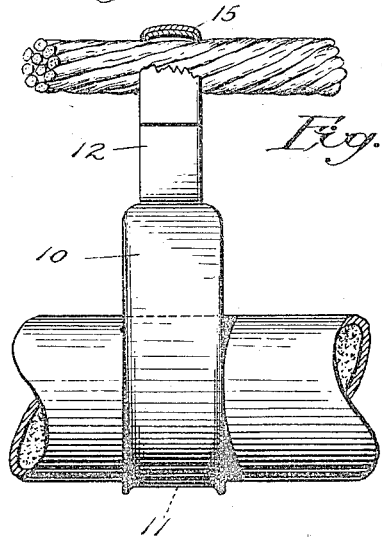
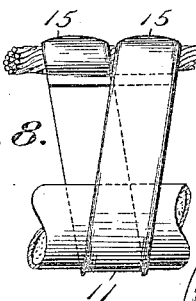
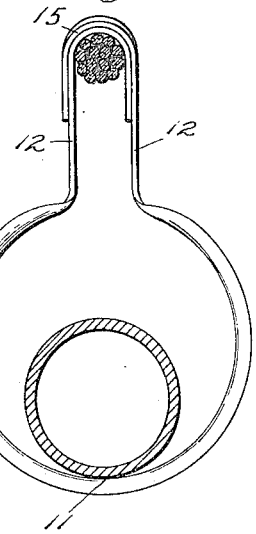
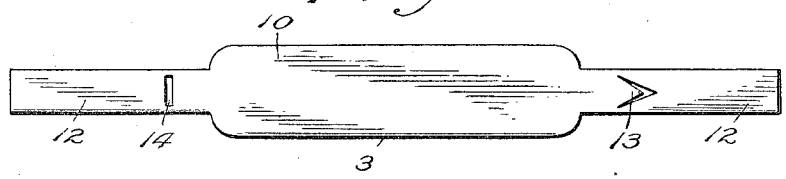
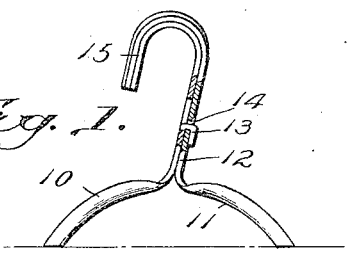
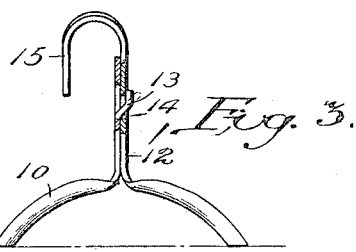
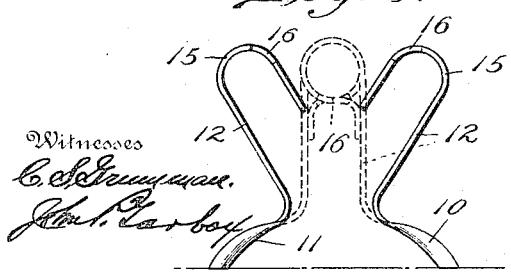
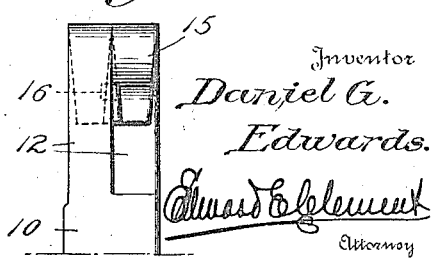
Inventor
Daniel G. Edwards.

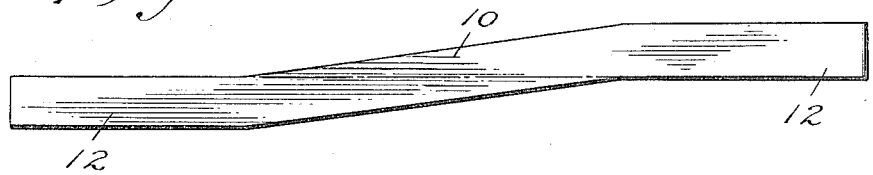
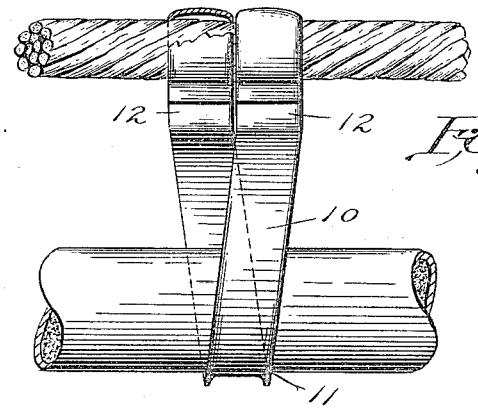
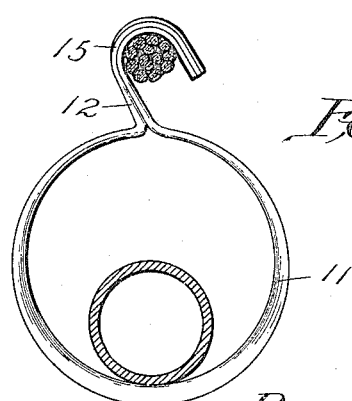

UNITED STATES PATENT OFFICE.

DANIEL G. EDWARDS, OF ATLANTA, GEORGIA.

CABLE-HANGER.

1,215,009.    Specification of Letters Patent.    Patented Feb. 6, 1917.

Application filed January 24, 1914. Serial No. 814,133.

*To all whom it may concern:*

Be it known that I, DANIEL G. EDWARDS, a citizen of the United States, and residing at Atlanta, county of Fulton, State of Georgia, have invented certain new and useful Improvements in Cable-Hangers, of which the following is a specification, reference being had therein to the accompanying drawing.

My invention relates to cable hangers of that type commonly used for the suspension of telephone conductor cables upon steel or other span cables. It is however not limited to such use, being capable of use wherever any cable is to be suspended from a relatively fixed support, such for instance as in the so called catenary suspension systems of electric railways. In such systems the trolley is supported from a catenary cable by hangers of various lengths so that the trolley occupies a substantially straight line free from sags or other disturbing irregularities.

The objects of my invention are manifold. I have aimed to produce a cable hanger which in the first place did not wear, cut or crystallize the lead sheath of the telephone cable, which in the second place permitted the cable to be freely drawn therethrough, which in the third place could be readily and strongly secured upon the suspension cable and which in the fourth place could be economically manufactured and marketed. As will be seen upon an understanding of my invention, I have attained all of these objects by utilizing a construction in the main heretofore unknown to the art. Most of the devices heretofore on the market have been defective along one or more of the lines set forth.

In the accompanying drawings I show the best forms of my invention now known to me, but I desire to have it understood that my invention may be given other forms by those skilled in the art without departing in any wise from its generic spirit, and in the claims annexed hereto I intend to cover such modifications.

Of the drawings Figure 1 shows the principal form of my invention in side elevation and partial section, Fig. 2 shows a blank sheet metal from which this form of the device is made, Fig. 3 shows a modified form of any similar lines, Fig. 4 is an end elevation of a second modification, Fig. 5 is a side view of the same with the top in section, Figs. 6 and 7 are partial side and end elevations of a third form, and Fig. 8 is a side elevation on a reduced scale of a fourth form.

Fig. 9 is a plan view of a blank from which the additional modification shown in Fig. 10 is formed, and Fig. 11 is a plan view of the blank from which the still further modification of Fig. 12 is formed.

Referring to Figs. 1 and 2, the band of metal of Fig. 2 is punched from a strip or sheet by a suitable machine. It is then formed up by hand or other suitable machine into the loop 10 of Fig. 1. The loop is of a substantial circular shape (as in the form of Figs. 4 and 5), and its principal bearing surface 11 at the bottom is formed of cylindrical shape and of substantial width (or length) of cylindrical surface. By substantial width I mean a width so great that there will not be appreciable wearing, cutting, or crystallizing action on account of vibration and friction, rarely entirely absent and in windy weather very great in degree. The type of the cable hangers now in use make use of a sharply curved bearing surface at the point 11, and the wear upon the cable sheath is considerable, resulting in a period of months in a small opening in the lead sheath whereupon the cable conductors are subject to weather conditions and troublesome cross and ground circuits result. This cannot occur in the hanger of my invention. Preferably the width of the bearing surface 11 is from one quarter inch to two inches depending upon the size and weight of the cable to be supported. The outer edges of the surface 11 are curved outwardly on an arc of small radius to ease the cable when it is being drawn through, and to prevent any cutting or scarring of the sheath or insulation thereof.

The upper ends 12 of the loop Fig. 1 are formed symmetrically with the body 10 thereof, but of less width. When the blank 3 is punched or formed, temporary complemental fastening means is formed at corresponding points on the two ends 12, these fastening means in the present embodiment consisting of the lip 13 punched out of one end 12 and adapted to project through a slot 14 punched in the other end thereof.

When the body 10 of the loop is formed up into circular shape, the ends 12 are bent toward each other and temporarily fastened in contiguity by projecting the lip 13 through the slot 14 and springing or bending it over. Thereafter the two ends 12 are integrally united by galvanizing, soldering, brazing or the like, or by means of any other permanent fastening means of great strength. Their extremities are bent over to form a hook 15 by means of which the loop may be hung from the suspension wire as indicated. In this form of my invention, the ends 12 are permanently united together throughout their lengths, whereby a hook 15 of very great strength is had. Thus while the punching of Fig. 3 may be from very thin metal, the body of the loop 10 is braced by the outwardly turned edges, and the hook being formed of a double thickness is of more than ample strength. At the same time the material and proportions are such that the hook may be readily bent to form an eye surrounding the suspension wire, or adjusted to suspension wires of various sizes as desired.

The modification of my invention shown in Fig. 3 differs from that shown in Figs. 1 and 2 principally in the fact that but one end 12 is bent to form the hook 15 instead of both ends thereof as in Figs. 1 and 2.

The form of Figs. 4 and 5 differs from the forms of Figs. 1 and 2 in that while both ends are bent over to constitute the hook 15, they are bent over from opposite directions, and are not temporarily or permanently fastened together before being placed upon the suspension wire, the portions of the ends 12 adjoining the body 10 of the loop, being spaced apart a distance approximately equal to the diameter of the suspension cable. If desired of course these ends might be fastened together near the body 10, and the ends left free to be over-lapped over the suspension cable and over each other from opposite directions. Thereafter the lapped ends might be permanently soldered or otherwise fastened together.

Figs. 6 and 7 show a form of my invention differing very considerably from the preceding forms, in that the ends 12 of the loop are dissymmetrically formed as respects the main body 10, one on each side of the central plane thereof and of a width approximately equal to one-half the width of the body 10. These ends when lapped over the suspension cable therefore independently engage the suspension cable, and are independently bent under the suspension cable from opposite directions to form two eyelets as clearly shown in Fig. 6. Obviously these end portions do not over-lap each other, but instead rest upon the suspension cable side by side. This form has the advantage that registering notches 16 may be formed on the adjacent edges of the ends 12, and in such longitudinal position that when the ends are bent over to form the eyelets as shown in Fig. 6, the ends 12 may be forced laterally a small distance beneath the suspension cable and caused to intersect each other and lock together. This is clearly indicated in Fig. 7. Thus while not interconnected above the suspension cable, the two ends 12 of the loop are interconnected below the suspension cable with substantially the same increase in holding strength.

In the fourth modification of Fig. 8, instead of cutting the ends 12 of reduced width, the entire band of metal is cut of the same width, and the hooks 15 formed by bending the extremities of the band toward each other from opposite sides while the body portion 10 of the band is bent into a spiral loop. Thus the ends 12 dodge each other and when placed upon the suspension cable engage it separately. As in the form of Figs. 6 and 7, the extremities of the ends 12 are bent over and under the suspension cable to form eyelets, and may be interconnected through notches as in the form of Figs. 6 and 7.

In the principal forms of my invention heretofore described, there will be noticed a very prominent feature, to wit, the concave transverse form of that portion of the hook 15 which engages the messenger cable. By reason of this concavity, the hook engages the top of the messenger cable by its edges, and it is therefore far less liable to slip along the cable and become displaced as the conductor cable is being drawn through, than are the old forms of these devices in which the tops of the hooks 15 were flat or convex on their under sides.

In the form of Figs. 9 and 10 the blank is cut with the two end portions 12 parallel but laterally displaced to positions in which they do not overlap, as indicated by the dot and dash line connecting their adjacent edges, and the main body 10 interconnecting these end portions extends on a bias between them. The tops of hooks 15 are formed concave on their under sides as clearly illustrated.

The form of Figs. 11 and 12 is similar in general to the form of Figs. 2 and 5 with the exception that the lateral margins taper toward each other from the center outwardly, whereby when turned there are formed edge flanges of progressively decreasing width from the bottom of the ring to the top as clearly shown in Fig. 12. The concave hook 15 is also clearly shown in Fig. 12.

What I claim is:

1. A cable hanger comprising a band of metal bent to form a substantially closed loop with upwardly extending ends or projections, said loop adapted to receive and hold a cable and said ends being oppositely bent to form overlapping hooks which when the hanger is in position will rest upon the suspension or messenger wire one within the other with the ends on opposite sides of the wire, whereby the ends are secured together and with the loop form a closed figure, independent movement of the ends under suspension strains or swaying being prevented.

2. A cable hanger comprising a band of metal bent to form a loop adapted to hold a conductor cable, and provided at its upper end with a supporting hook formed of strip metal and concaved on the under side of its top whereby it engages the messenger cable by its opposite edges as contradistinguished from its central portion.

3. A cable hanger for use with a messenger wire or cable comprising a band of stiff metal formed into a closed cylindrical loop of greater diameter than the cable to be supported therein, the opposite edges of the band being turned over all around the loop to form a narrow stiffening flange, whereby the shape of the loop is preserved under strain and the cable permitted to ride freely therein on a broad cylindrical surface, while the ends of the band are extended radially with respect to the loop having a hook integrally formed upon them to engage the messenger wire, said hook being concaved or channeled on its inner surface, whereby its weight and the weight of the cable will be supported upon its outer edges, and longitudinal sliding movement of the messenger wire will be reduced to a minimum.

4. A cable hanger comprising a band of metal bent into a loop with outwardly extending ends or projections, said loop adapted to receive and hold a cable and said ends bent to form suspension hooks for the loop, the said hooks being concaved or channeled on their inner surfaces to form edges for engagement with a support.

5. A cable hanger for use with a messenger wire or cable comprising a band of stiff metal formed into a closed cylindrical loop of greater diameter than the cable to be supported therein, the opposite edges of the band being turned over all around the loop to form a narrow stiffening flange, whereby the shape of the loop is preserved under strain and the cable permitted to ride freely therein on a broad cylindrical surface, while the ends of the band are extended radially with respect to the loop having a hook integrally formed upon each of them to engage the messenger wire, said hooks having their open ends turned in opposite directions, and long enough to come below the messenger wire when in position, whereby said messenger wire is inclosed between two members of the band on each side, and lateral displacement thereof is prevented by the weight of the loop and the weight of the cable.

In testimony whereof I affix my signature in presence of two witnesses.

DANIEL G. EDWARDS.

Witnesses:
L. E. DENNY,
C. W. WALDEN.

Copies of this patent may be obtained for five cents each, by addressing the "Commissioner of Patents, Washington, D. C."